United States Patent [19]

Toba et al.

[11] 4,442,160

[45] Apr. 10, 1984

[54] ELECTROSTATIC RECORDING MEDIUM HAVING AN ELECTRICALLY CONDUCTIVE LAYER CONTAINING PRE-DISPERSED ELECTRICALLY CONDUCTIVE CARBON BLACK AND POLYURETHANE BINDER RESIN

[75] Inventors: Hirotaka Toba; Masanori Itoh, both of Himeji; Keita Nakano, Ebina; Shoji Wakoh, Ebina; Toshihiko Toyoshima, Ebina; Hidemasa Todo, Ebina, all of Japan

[73] Assignees: Daicel Chemical Industries, Ltd., Osaka; Fuji Xerox Co., Ltd., Tokyo, both of Japan

[21] Appl. No.: 397,943

[22] Filed: Jul. 13, 1982

Related U.S. Application Data

[63] Continuation-in-part of Ser. No. 274,683, Jun. 17, 1981, Pat. No. 4,410,584.

[30] Foreign Application Priority Data

Jul. 21, 1981 [JP] Japan ............................... 56-114051

[51] Int. Cl.$^3$ .......................... B32B 5/00; G03G 5/02

[52] U.S. Cl. ...................................... 428/215; 430/69; 428/415; 428/416; 428/426; 428/441

[58] Field of Search ........................ 430/62, 63, 64, 69; 428/215, 415, 416, 426, 441

[56] References Cited

U.S. PATENT DOCUMENTS

| | | | |
|---|---|---|---|
| 3,403,019 | 9/1968 | Stably et al. | 430/62 |
| 3,861,954 | 1/1975 | Funderburk | 428/331 |

FOREIGN PATENT DOCUMENTS

| | | | |
|---|---|---|---|
| 41-3308 | 2/1966 | Japan | 427/121 |
| 52-74353 | 6/1977 | Japan | 427/121 |
| 52-74354 | 6/1977 | Japan | 427/121 |
| 56-80048 | 7/1981 | Japan | 430/62 |
| 56-128967 | 10/1981 | Japan | 430/62 |
| 2027616A | 2/1980 | United Kingdom | 428/207 |

*Primary Examiner*—John E. Kittle

*Assistant Examiner*—John L. Goodrow

*Attorney, Agent, or Firm*—Flynn, Thiel, Boutell & Tanis

[57] ABSTRACT

An electrostatic recording medium is disclosed comprising a recording layer, a conductive layer, and a support, the conductive layer being a dried coating film of a mixture composed of (A) a polyurethane binder resin prepared by reaction of a polyester and a polyisocyanate, and (B) a predispersion of carbon black.

10 Claims, 2 Drawing Figures

ELECTROSTATIC RECORDING MEDIUM HAVING AN ELECTRICALLY CONDUCTIVE LAYER CONTAINING PRE-DISPERSED ELECTRICALLY CONDUCTIVE CARBON BLACK AND POLYURETHANE BINDER RESIN

CROSS REFERENCE TO RELATED APPLICATION

This application is a continuation-in-part of application Ser. No. 274,683, filed June 17, 1981 now U.S. Pat. No. 4,410,584.

The present invention relates to a reusable electrostatic recording medium which is employed in a system wherein a scanning apparatus that supplies signals consecutively by means of a multi-stylus head, forms a latent image on the recording medium, then the latent image is developed, then the developed image is transferred to plain paper, and then the developed image is fixed on the plain paper.

A system that forms an electrostatic latent image by applying a signal voltage to a recording medium by means of a multi-stylus head is known as an electrostatic recording system. Such a system usually employs, as a recording medium, a coated paper comprising a recording layer and a paper substrate, with an electrically conductive layer interposed between the recording layer and substrate. A recording paper of this type carrying a latent image undergoes development and fixing in order to form a visible image. This recording system suffers from several disadvantages: first, the system is expensive because the recording paper is consumed each time a recorded image is made; second, the sharpness of the recorded image is affected by the paper quality; and third, the conductive material used for the conductive layer is limited in its performance capability and can greatly affect the image quality, depending on the ambient humidity.

Recently, an electrostatic recording system in which the developed image is transferred to plain paper has attracted attention as one way of overcoming the above-mentioned disadvantages. According to this system, an electrostatic latent image is formed on an electrostatic recording medium, the image is then developed, the developed image is transferred to plain paper and is fixed thereon. (Refer to, for example, Japanese Patent Publication No. 46-34077 (1971).)

This system would be economically advantageous if it were possible to reuse the previously used electrostatic recording medium after removal of residual developer and residual electric charge. In addition, it would be possible to obtain a sharp image if the recording medium afforded improved performance. The electrostatic recording medium for such a transfer-type recording system is composed of a base film, a conductive film layer of metal deposited on the base film, and a recording layer on top of the metal film layer.

Such a transfer-type recording system has certain disadvantages. It is difficult to consistently produce a uniform deposited metal film having a surface resistivity of $10^6$ to $10^8$ ohms which is suitable for the electrostatic recording system. The surface resistivity varies greatly depending on the conditions under which the metal is deposited on the film.

Further, the deposited metal film changes greatly in resistivity when it is subjected to a high voltage repeatedly by a multi-stylus head or corotron, or when it is irradiated with ultraviolet rays while the corotron is supplied with a high voltage. Therefore, this system is not satisfactory when it is necessary to produce stable, consistent images for a long period of time. A corona-discharging wire is used as corotron.

It is an object of the present invention to provide an electrostatic recording medium for a transfertype recording system which is basically composed of three layers comprising a support, a conductive layer, and a recording layer, wherein the conductive layer is made of a material which provides the prescribed resistivity, maintains the resistivity with only little variation over time, and is stable under a variety of environmental conditions, particularly for wide ranges of temperatures and humidities.

The conductive layer, which is the key aspect of the present invention, is essentially composed of a mixture of an organic polymeric binder having an electrically conductive, fine powder dispersed therein. The organic polymeric binder can be acrylic resin, urethane resin and rubbers. The present inventors selected pre-dispersed, electrically conductive carbon black as the electrically conductive fine powder from the standpoints of low price and ease of handling. A pre-dispersion of carbon black is defined as being a dispersion of finely divided carbon black particles dispersed in an inert organic liquid, which predispersion is formed in advance of mixing some with the organic polymeric binder to form a composition for making the electrically conductive layer. The present inventors studied various combinations of this pre-dispersion of carbon black with various kinds of organic binders with respect to (1) the stability of the resistivity of the conductive layer under varying temperature and humidity conditions (5° to 45° C. and 15 to 88% RH), (2) adhesion to the support layer, (3) ease of heat lamination of the conductive layer, (4) film strength of the conductive layer, and (5) practical characteristics involved in actual use, such as coatability. The present invention was made based on the results of these studies. According to the present invention, a polymer film is used as the recording layer and it can be bonded easily to the electrically conductive layer by heat lamination, with the result being that an intermediate adhesive layer can be omitted, whereby the recording medium is thereby simplified in structure. In addition, the recording medium of this invention can be produced continuously by an extremely short coating process.

Among the many polyurethane binder resins that are derived from the reaction products of polyisocyanate compounds with polyesters made from a dibasic acid, such as phthalic acid and adipic acid, and a polyether polyol, such as poly(oxypropylene ether), acrylic polyol, castor oil derivative, tall oil derivative, or other hydroxyl group-containing compounds, a polyurethane binder resin made from a polyester and a polyisocyanate was found most suitable in this invention from the viewpoint of mechanical strength, stability under varied conditions of temperature and humidity, and adhesion to the support.

Thus, the present invention relates to a transfer-type electrostatic recording medium comprising a recording layer, an electrically conductive layer, and a support, wherein the electrically conductive layer is a dried coated film of a mixture composed of (A) a polyurethane binder resin prepared by reaction of a polyester with a polyisocyanate and (B) a predispersion of carbon black.

BRIEF DESCRIPTION OF THE DRAWING

Referring to FIG. 1, the transfer-type electrostatic recording medium of this invention is composed of three layers, namely, a support 1, an electrically conductive layer 2, and a dielectric recording layer 3. The support 1 is made of a metal, such as aluminum, stainless steel, copper, or brass, or a plastic such as polyester (e.g., polyethylene terephthalate), polyvinyl chloride, polycarbonate, polypropylene, or polyamide. The support 1 has a flat surface. It is used in the form of a drum or belt, or in any other form suitable for the electrostatic recording process and post processing.

Figure 1:
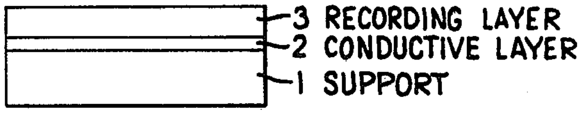
FIG. 1 is a schematic sectional view of an electrostatic recording medium according to this invention.

The electrically conductive layer 2, to which the present invention particularly relates, is a dried coated film of a mixture composed of (A) a polyurethane binder resin prepared by reaction of a polyester with a polyisocyanate and (B) a predispersed carbon black. Preferably, the conductive layer 2 has a surface resistivity of from $10^6$ to $10^8$ ohms and a film thickness of from about ten to several tens of microns. If the conductive layer 2 is too thin, the thickness of it tends to be uneven, resulting in variations in the surface resistivity and, hence, variations in the image density after recording. The conductive layer 2 should preferably be sufficiently thick that the surface resistivity thereof is not affected by the film thickness. A thickness of from 0.3 to 50 microns, preferably 10 to 30 microns, for the conductive layer 2 is suitable.

The conductive layer 2 should be prepared carefully so that no pinholes are formed thereon. Pinholes leave the image partly unrecorded, thereby adversely affecting the quality of the latent and developed images. The formation of pinholes can be avoided by coating the liquid for forming the conductive layer 2 on the support by two or more separate coating steps. The uniform conductive layer 2 thus prepared provides improved image quality.

Typical examples of polyurethane binder resins are the polyurethane resins that are produced by the reaction of (1) a polyester or a polyether and (2) a polyisocyanate. Polyurethanes produced by the reaction of polyesters and polyisocyanates are suitable for the conductive layer 2 used in the electrostatic recording medium of this invention, because same have surface resistivities which are stable over a wide range of temperature and humidity conditions. The polyurethane binder resin used in this invention can be of the solvent solution type, the aqueous solution type, or the aqueous dispersion type. It is preferred to use a solvent solution-type polyurethane binder resin containing only small amounts of additives or auxiliary materials which might have side effects.

The polyester used for making the polyurethane binder resin is produced by reacting a polybasic organic acid, mainly a dicarboxylic acid, and a polyol. Examples of suitable dicarboxylic acids include saturated aliphatic acids, such as oxalic acid, succinic acid, glutaric acid, adipic acid, pimelic acid, suberic acid, azelaic acid, sebacic acid, and isosebacic acid; unsaturated aliphatic acids, such as maleic acid and fumaric acid; and aromatic acids, such as phthalic acid and isophthalic acid and anhydrides thereof. Such acids can be used individually or in mixtures of two or more of them. Dimer acids obtained by dimerization of unsaturated aliphatic acids can also be used.

Examples of suitable polyols include diols, such as ethylene glycol, diethylene glycol, triethylene glycol, propylene glycol, butylene glycol and neopentyl glycol; triols, such as trimethylolpropane, trimethylolethane, hexanetriol, and glycerin; and hexols, such as sorbitol.

The polyester which can be used as a reactant for making the polyurethane binder resin of the invention is produced from various combinations of polybasic acids and polyols. In addition, a lactone which is an intramolecular ester and derivatives thereof can also be used as a reactant for preparing the polyester.

The polyisocyanate used, in combination with the above-mentioned polyesters, for preparing the polyurethane binder resin of the invention is exemplified by tolylene diisocyanate, 3,3'-ditolylene-4,4'-diisocyanate, diphenylmethane, 4,4'-diisocyanate, 3,3'-dimethyldiphenylmethane-4,4'-diisocyanate, and 2,4-tolylene diisocyanate dimer.

The carbon black dispersed in the conductive layer 2 is one which is commercially available as conductive carbon black for preparing electrically conductive polymer compositions. Furnace black and acetylene black are preferably used in this invention. Thermal black and channel process black having low conductivity can also be used.

Prior to use, the carbon black should be finely dispersed in the polyurethane binder resin, by using a three-roll mill or ball mill, so that the carbon black is kept stably dispersed, chemically stable, and durable in the binder resin. A desired surface resistivity of the layer 2 is obtained by adjusting the kind and quantity of carbon black employed. The carbon black pre-dispersion should be such that carbon black particles of less than 0.3 micron in particle size account for more than 90 weight % of the total dispersed carbon black particles. Such fine particles dispersed in the polyurethane binder resin provide a high resolution and high recording density.

In order to achieve a surface resistivity from $10^6$ to $10^8$ ohms as needed for the conductive layer 2 of the electrostatic recording medium of this invention, it is necessary to adjust the quantity of the carbon black pre-dispersion to be added, depending on the type of polyurethane binder resin used. Usually, 2 to 40 parts by weight of carbon black should be added to 98 to 60 parts by weight of polyurethane binder resin (including the polyurethane, the dispersant (if any) used with the polyurethane binder resin, and the dispersing adjuvant (if any) used in the carbon black pre-dispersion). If the surface resistivity of the conductive layer 2 is lower than $10^6$ ohms or higher than $10^8$ ohms, the resulting image becomes low in density and blurred.

The optimum surface resistivity of the conductive layer 2 which provides the sharpest electrostatically produced copies varies, depending on the multi-stylus head system used and other conditions. Preferably, the range of variation of surface resistivity, within the range of usual environmental conditions of temperature (5° to 45° C.) and humidity (10 to 90% RH), should be less than a factor of 10, that is, a conductive layer having a nominal surface resistivity of $10^7$ at 25° C. and 30% RH, should not have a surface resistivity of less than $10^6$ or more than $10^8$ at other temperatures and humidities within the above-described ranges. In order to minimize the fluctuation of the surface resistivity due to temperature differences, it is necessary to use a polyurethane binder resin having a low glass transition temperature, and in order to minimize the fluctuation of the surface resistivity due to humidity differences, it is necessary to use a polyurethane binder resin having a low water absorption.

In the range of resistivity as defined above, the resistivity is greatly affected when the quantity of the electrically conductive carbon black pre-dispersion dispersion in the conductive layer is varied. Therefore, the carbon black pre-dispersion should be weighed accurately and then added carefully to the polyurethane binder resin when the coating dispersion is prepared.

The conductivity of the conductive layer 2 varies greatly, depending on the type and relative proportions of polyurethane binder resin and carbon black predispersion, as mentioned later in the examples and comparative examples. The conductivity is also affected by the dispersibility (compatibility) of the carbon black pre-dispersion to the polyurethane binder resin. This dispersibility can be improved by adding a suitable solvent, plasticizer, dispersant and polyurethane resin to the carbon black predispersion.

It is essential that the recording layer 3 of the electrostatic recording medium of this invention should be a dielectric material having a volume resistivity of at least $10^{12}$.Ω cm, preferably at least $10^{14}$.Ω cm, if electric charges are to be stored on the surface thereof for recording. Such a dielectric includes organic dielectrics, such as polyester, polycarbonate, polyamide, polyurethane, (meth)acrylic resin, styrene resin, and polypropylene, and mixtures of organic dielectrics and inorganic dielectric powders such as $TiO_2$, $Al_2O_3$ and MgO. The recording layer 3 can be formed by applying a resin solution or laminating a film on the conductive layer 2. The recording layer 3 should be at least 1 micron thick to avoid dielectric failure, but should be thinner than 20 microns from the standpoint of resolution. A preferably thickness of the recording layer 3 is from 2 to 10 microns.

According to this invention, it is possible to add a polyisocyanate to the dispersion liquid of the polyurethane binder resin and the electrically conductive carbon black pre-dispersion used for making the conductive layer 2 of the electrostatic recording medium of the invention. The polyisocyanates used for this purpose include those which are represented by the following formulas:

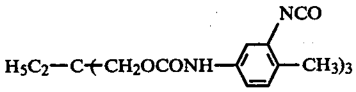

$H_5C_2-C-(CH_2OCONH-C_6H_{12}-NCO)_3$

-continued

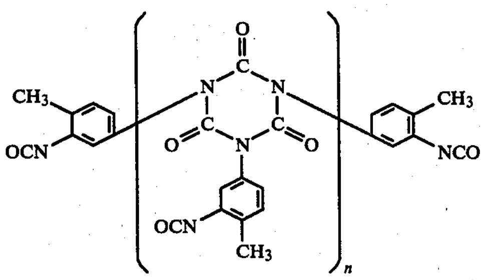

wherein n≧1.

Aliphatic polyisocyanates are preferable from the standpoint of prolonged stability after blending with respect to the viscosity of the coating liquid and the conductivity of the electrically conductive layer 2.

The pre-dispersion of carbon black to be used in the invention is prepared from electroconductive fine particles of carbon black, an organic polymer binder and a solvent, which are hereinafter called as P, R and S, respectively. Into a ball mill are introduced the electroconductive fine particles P, a part of the organic polymer binder $R_1$ and a part of the solvent $S_1$ and then the resulting mixture is milled for about 40 hours. It is preferred that the pre-dispsersion may be obtained in this way so as to have a weight ratio of P to $R_1$ within a range of 1.5 to 0.4.

The obtained pre-dispersion is mixed with the other portion of the organic polymer binder $R_2$ and the other portion of the solvent $S_2$ in order to produce a coating liquid consisting of P, R and S. It is practical that the mixing step of the pre-dispersion, $R_2$ and $S_2$ is conducted under agitation at 1000 rpm, for about 10 mins.

In the method for preparing the pre-dispersion and the coating liquid, the above mentioned polyurethane binder resin is used as both $R_1$ and $R_2$. It is suitable that $R_1$ and $R_2$ are of the same kind or compatible with each other. $S_1$ is a good solvent to the polyurethane resin binder, such as dimethylformamide and tetrahydrofuran. $S_2$ is a poor solvent thereto, such as methylethylketone. A mixture solvent comprising the above as the major component may be used as $S_1$ or $S_2$.

The electrostatic recording medium of this invention employs, as the conductive layer 2, a dried coating film of a mixture of the polyurethane binder resin and the carbon black predispersion. This provides the following effects:

(1) The surface resistivity is less susceptible to change caused by variations of ambient temperature and humidity;

(2) The crosslinking agent added improves the adhesion between the conductive layer 2 and the support 1 and between the conductive layer 2 and the recording layer 3;

(3) The finely dispersed carbon black is stable under various environmental conditions, such as temperature, humidity and light;

(4) The fine dispersion of carbon black particles provides recorded images having a high resolution and high density;

(5) It is easy to produce a conductive layer 2 having a prescribed surface resistivity by adjusting the quantity of carbon black pre-dispersion to be added;

(6) In a case in which the conductivity in the direction parallel with the surface of the conductive layer 2 is used, the recording medium of this invention can perform electrostatic recording at a high voltage, because carbon black particles act as capacitors, thereby minimizing locally large currents in a comparatively short time, when a locally high voltage is applied;

(7) The recording medium of the invention is inexpensive and is mechanically and electrically durable;

(8) If a thin dielectric film is used as the recording layer 3, it can be bonded by heat lamination directly to the conductive layer 2 without using an adhesive.

The electrostatic recording medium of this invention is used for a transfer-type recording system in which the electrostatic latent image is transferred to plain paper. It is superior in mechanical and electrical durability and is resistant to electrical degradation after repeated use, and consistently provides high quality images. No deterioration in performance was observed in tests in which the same recording medium was used for a total of 30,000 times. The electrostatic recording system using the electrostatic recording medium of this invention provides fast recording with good image quality and easy maintenance of the equipment. Therefore, it will be broadly useful in facsimile and a variety of other printers.

The invention is further described by reference to the following examples, in which all parts are by weight.

The surface resistivity was measured as follows:

A specimen of the electrostatic recording medium was cut in the form of a rectangle measuring 7 cm by 10 cm. Strips of the recording layer 3 having widths of 1.5 cm were removed along the short sides of the rectangular electrostatic recording medium. A grounding material was applied to the parts from which the recording layer 3 was removed, and then dried, so that a 7 cm by 7 cm square recording medium was provided for measurement. The grounding material was prepared by adding carbon black to a binder in such a ratio that the surface resistivity of the coated film of grounding material after drying was about $10^2$ ohms. The grounding parts along both edges of the sample were clamped by metal clips, between which was applied a constant voltage of 25 V using a variable dc constant voltage, constant current, power source (Model 410-350, made by Metronics Co., Ltd.). One minute later, the current (I) flowing across the specimen was read using a digital multimeter made by A & D Co., Ltd. The surface resistivity R(Ω) was calculated as follows:

$$R(\Omega)=25/I$$

EXAMPLE 1

A coating dispersion was prepared by mixing, for 10 minutes, 100 parts of polyurethane resin (elastomer produced by the reaction of polyester and polyisocyanate, Resamin cu-520LV containing 30.0% solids, made by Dainichiseika Color & Chemicals Mfg. Co., Ltd.), 44.1 parts of carbon black pre-dispersion (Seika-Seven 07-960 containing 30% solids, made by Dainichiseika Color & Chemicals Mfg. Co., Ltd.), 144.2 parts of methyl ethyl ketone, and 1.4 parts of Colonate L (condensate [1:3 in molar ratio] of trimethylolpropane and tolylene diisocyanate, made by Nippon Polyurethane Co., Ltd.). The thus-prepared coating dispersion had a solids content of 15% and a ratio of carbon black to binder resin of 0.20 (abbreviated as P/R hereinafter).

The resulting coating dispersion was applied using an applicator to the corona discharge treated surface of a 75μ thick biaxially oriented polyester film (Diafoil) so that the coating thickness after drying was about 20 microns. The thus-applied layer serves as the conductive layer 2, and the 75μ polyester film serves as the support 1.

Then a 4μ thick biaxially oriented polyester film was bonded to the conductive layer 2 by heat lamination (at a roll temperature of 90° C. and roll pressure of 20 kg/cm). This 4μ polyester film serves as the recording layer 3.

The resulting three-layered sheet was used as the recording medium. The surface resistivity of the conductive layer was measured as described above.

Figure 2:
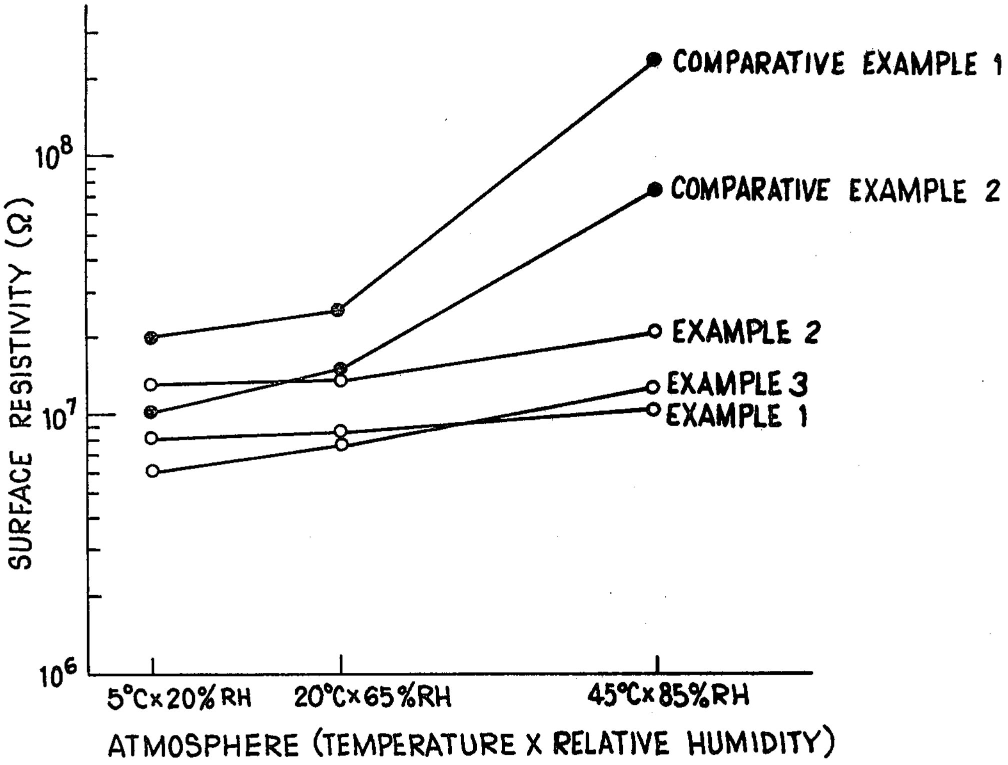
FIG. 2 is a graph showing the surface resistivity of the recording media obtained in Examples 1 to 3 and Comparative Examples 1 to 2, under a variety of temperature and humidity conditions.

The adhesion between the conductive layer 2 and the support 1 and between the conductive layer 2 and the recording layer 3 was evaluated. The surface resistivity and the temperature- and humidity-dependence of the surface resistivity of the conductive layer 2 were also evaluated. The results were satisfactory, as shown in Table 1 below. The dependence of the surface resistivity of the conductive layer 2 on temperature (5° C. to 45° C.) and humidity (20%RH to 85%RH) was small as shown in FIG. 2.

Using this recording medium, a signal voltage of +650 V was applied and the image was transferred, after development, to plain paper, and fixed. A good, sharp image having no thickening was obtained. The cycle of application of signal voltage, development, transfer and fixing was repeated 30,000 times, and every image obtained throughout the cycles was satisfactory.

EXAMPLE 2

The coating dispersion was prepared in the same manner as described in Example 1, except that the amount of carbon black pre-dispersion was 45.5 parts, the amount of Colonate L was 2.8 parts, the amount of methyl ethyl ketone was 145.7 parts, and the P/R=0.205.

As in Example 1, the coating dispersion was applied to a 75μ polyester film (support 1) to form a conductive layer 2 and a 4μ thick polyester film was bonded thereto by heat lamination to form the recording layer 3. The resulting recording medium was evaluated for the adhesion between the conductive layer 2 and the support 1 and between the conductive layer 2 and the recording layer 3, and for the surface resistivity of the conductive layer 2 and the dependence of surface resistivity on temperature and humidity. The results were satisfactory, as shown in Table 1.

The dependence of surface resistivity on temperature and humidity was measured under the same conditions as in Example 1. The results were satisfactory as shown in FIG. 2.

Using this recording medium, image formation tests were carried out under the same conditions as in Example 1. A good, sharp image having no thickening was obtained. The cycle of application of signal voltage, development, transfer and fixing was repeated 30,000 times, and all the images obtained through all the cycles were satisfactory.

EXAMPLE 3

The coating dispersion was prepared by mixing, for 10 minutes, 100 parts of polyurethane resin (elastomer produced by the reaction of polyester and polyisocyanate, Resamin cu-4425LV containing 30.0% solids, made by Dainichiseika Color & Chemicals Mfg. Co., Ltd.), 48.94 parts of carbon black pre-dispersion (Seika- Seven 07-960 containing 30% solids, made by Dainichiseika Color & Chemicals Mfg. Co., Ltd.), 132.9 parts of methyl ethyl ketone, and 3.4 parts of polyisocyanate (condensate of trimethylolpropane and hexamethylene diisocyanate=1:3 in molar ratio; made by Nippon Polyurethane Co., Ltd.). The solids content of the thus-prepared coating dispersion was 16% and P/R=0.215.

The resulting coating dispersion was applied to a 75μ polyester film (support 1) as in Example 1 to form the conductive layer 2. Then, a 4μ thick polyester film was bonded thereto by heat lamination under the same conditions as in Example 1 to form the recording layer 3.

The adhesion between the conductive layer 2 and the support 1 and between the conductive layer 2 and the recording layer 3 was evaluated. Also, the surface resistivity and the temperature- and humidity-dependence of the surface resistivity of the conductive layer 2 were evaluated. The results were satisfactory as shown in Table 1. The dependence of the surface resistivity of the conductive layer 2 on temperature and humidity was small as shown in FIG. 2.

Using this recording medium, image formation tests were carried out under the same conditions as in Example 1. A good sharp image having no thickening was obtained. The cycle of application of signal voltage, development, transfer and fixing was repeated 10,000 times, and all the images obtained through all the cycles were satisfactory with respect to sharpness.

COMPARATIVE EXAMPLE 1

The coating dispersion was prepared by mixing, for 30 minutes, 100 parts of acrylic emulsion (Sebian A, containing 40% solids, made by Daicel Ltd.) instead of polyurethane resin, 54.6 parts of carbon black pre-dispersion (containing 36.6% solids), 127.4 parts of solvent mixture of methanol/deionized water (1:1 by weight), and 24 parts of 5% aqueous solution of methyl cellulose (Metolose 90SH 100, made by Shin'etsu Chemical Co., Ltd.), the solids content thereof being 20% and P/R=0.50.

The resulting coating dispersion was applied to a 75μ polyester film (support 1) as in Example 1 in a thickness of 20μ to form the conductive layer 2, and a 4μ polyester film was heat laminated thereon to form the recording layer 3 as in Example 1, to form the recording layer.

The adhesion between the conductive layer 2 and the support 1 and between the conductive layer 2 and the recording layer 3 was poor, and the temperature- and humidity-dependence of the surface resistance of the conductive layer 2 was great as shown in Table 1.

Using this recording medium, image formation tests were carried out under the same conditions as described in Example 1. Good sharp images having no thickening were obtained in an atmosphere of low temperature and low humidity, or normal temperature and normal humidity. However, the surface resistivity of the conductive layer 2 increased in an atmosphere of high temperature and high humidity as shown in FIG. 2. The resulting images were not clear.

COMPARATIVE EXAMPLE 2

The coating dispersion was prepared by mixing, for 10 hours, 100 parts of ethylene-vinyl acetate copolymer/nitrile rubber (67.8/32.2 by weight) instead of polyurethane, 29 parts of carbon black, and 608.1 parts of solvent mixture of methyl ethyl ketone/toluene (2:1 by weight) in a stainless steel ball mill, solids content 17.5% and P/R=0.29. The resulting coating dispersion was applied to a 75μ polyester film as in Example 1 in a thickness of 20μ and a 4μ polyester film was heat laminated thereto to form the recording medium.

The adhesion between the conductive layer 2 and the support 1 and between the conductive layer 2 and the recording layer 3 was poor, and the temperature- and humidity-dependence of the surface resistance of the conductive layer 2 was great as shown in Table 1.

Using this recording medium, image formation tests were carried out under the same conditions as in Example 1. Good sharp images having no thickening were obtained in an atmosphere of low temperature and low humidity, and at a normal temperature and normal humidity. However, the surface resisticity increased in an atmosphere of high temperature and high humidity as shown in FIG. 2. The resulting images were not clear.

The cycle of application of electric charge, development, transfer and fixing was repeated. The resulting images remained the same with respect to sharpness. However, delamination occurred due to poor ahesion between the recording layer and the conductive layer, and image formation was substantially impossible after several hundred cycles.

TABLE 1

Performance of Electrostatic Recording Medium

| | Surface resistivity of conductive layer (Ω; 20° C.; 65% RH) | Adhesion*1 conductive layer to support | conductive layer to recording layer | Dependence of*2 surface resistivity on temperature and humidity |
|---|---|---|---|---|
| Example 1 | $8.2 \times 10^6$ | 0 | 0 | 0 |
| Example 2 | $1.3 \times 10^7$ | 0 | 0 | 0 |
| Example 3 | $6.3 \times 10^6$ | 0 | 0 | 0 |
| Com. Ex. 1 | $2.5 \times 10^7$ | Δ | Δ | X |
| Com. Ex. 2 | $1.4 \times 10^7$ | Δ | X | X |

Remarks:
*1Adhesion of laminate film bonded by hot rolling at 90° C. and 20 kg/cm.
0 Good
Δ Slightly weak
X Weak
*20 Surface resistivity of the conductive layer is from $5 \times 10^6$ to $5 \times 10^7$ in an atmosphere of 5° C., 20% RH to 45° C., 85% RH.
X Surface resistivity of the conductive layer of other values than above.

The embodiments of the invention in which an exclusive property or privilege is claimed are defined as follows:

1. An electrostatic recording member adapted to be used for repetitive formation and development of electrostatic latent images, followed by transfer of the developed images from said member to successive separate paper sheets, said member consisting essentially of:

a support;

an electrically conductive layer laminated directly on top of said support, said electrically conductive layer consisting essentially of a mixture of fine powder of predispersed electrically conductive carbon black uniformly dispersed in a polyurethane binder resin prepared by reacting a polyester with a polyisocyanate, said electrically conductive layer having a surface resistivity in the range of from $10^6$ to $10^8$ ohms; and a non-photoconductive recording layer laminated directly on top of said electrically conductive layer, said recording layer consisting essentially of a dielectric material having a volume resistivity of at least $10^{12}$ ohm.cm.

2. An electrostatic recording member as claimed in claim 1, wherein said electrically conductive layer consists essentially of from 2 to 40 parts by weight of said fine powder of pre-dispersed electrically conductive carbon black uniformly dispersed in from 60 to 98 parts by weight of said polyurethane binder resin.

3. An electrostatic recording member as claimed in claim 2 in which said electrically conductive layer has a thickness in the range of from 10 to 30 microns and is free of pin holes.

4. An electrostatic recording member as claimed in claim 3 in which at least 90% by weight of said electrically conductive carbon black particles have a particle size of less than 0.3 microns.

5. An electrostatic recording member as claimed in claim 3 in which said recording layer has a thickness of from 1 to 20 microns.

6. An electrostatic recording member as claimed in claim 1, wherein said polyester used to form said polyurethane binder resin is prepared by reacting a polybasic organic acid and a polyol, and the polyisocyanate reacted with said polyester to form said polyurethane binder resin is selected from the group consisting of tolylene diisocyanate, 3,3'-ditolylene-4,4'-diisocyanate, diphenylmethane 4,4'-diisocyanate, 3,3'-dimethyldiphenylmethane-4,4'-diisocyanate, and 2,4-tolylene diisocyanate dimer.

7. An electrostatic recording member as claimed in claim 6, wherein said polybasic organic acid is selected from the group consisting of saturated aliphatic dicarboxylic acids, unsaturated aliphatic dicarboxylic acids, aromatic, dicarboxylic acids, and dimer acids obtained by dimerization of unsaturated aliphatic discarboxylic acids, and said polyol is selected from the group consisting of ethylene glycol, diethylene glycol, triethylene glycol, propylene glycol, butylene glycol, neopentyl glycol, trimethylolpropane, trimethylolethane, hexanetriol, glycerine and sorbitol.

8. An electrostatic recording member as claimed in claim 1, wherein said electrically conductive carbon black is selected from the group consisting of furnace black, acetylene black, thermal black and channel process black.

9. An electrostatic recording member as claimed in claim 1, wherein said polyurethane binder resin is cross-linked by a polyisocyanate compound selected from the group consisting of:

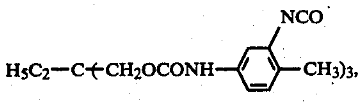

$H_5C_2—C—(CH_2OCONH—C_6H_{12}—NCO)_3$, and

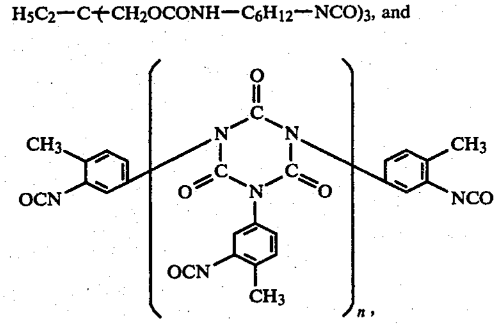

wherein n is an integer of 1 or more, and mixtures thereof.

10. An electrostatic recording member adapted to be used for repetitive formation and development of electrostatic latent images, followed by transfer of the developed images from said member to successive separate paper sheets, said member consisting essentially of:

a support in the form of a film or sheet made of a material selected from the group consisting of aluminum, stainless steel, copper, brass, polyesters, polyvinyl chloride, polycarbonate and polyamides;

an electrically conductive layer laminated directly on top of said support, said electrically conductive layer being free of pin holes, having a thickness of from 10 to 30 microns and consisting essentially of a mixture of 2 to 40 parts by weight of fine powder of pre-dispersed electrically conductive carbon black uniformly dispersed in 60 to 98 parts by weight of a polyurethane binder resin so that the sum of said binder and said powder is 100 parts by weight, said polyurethane binder resin having been prepared by reacting a polyester with a polyisocyanate, said electrically conductive layer having a surface resistivity in the range of from $10^6$ to $10^8$ ohms which resistivity is stable within a wide range of changes in temperature and humidity; and a non-photoconductive recording layer laminated directly on top of said electrically conductive layer, said recording layer having a thickness of from 2 to 10 microns and consisting essentially of a dielectric material having a volume resistivity of at least $10^{14}$ ohm.cm.

* * * * *

UNITED STATES PATENT AND TRADEMARK OFFICE

CERTIFICATE OF CORRECTION

PATENT NO. : 4,442,160

DATED : April 10, 1984

INVENTOR(S) : Hirotaka TOBA et al

It is certified that error appears in the above-identified patent and that said Letters Patent is hereby corrected as shown below:

Column 11, line 34; between "aromatic" and "dicarboxylic" delete the comma.

line 35; change "discarboxylic" to ---dicarboxylic---.

Signed and Sealed this

*Fourth* Day of *September 1984*

[SEAL]

*Attest:*

GERALD J. MOSSINGHOFF

*Attesting Officer* *Commissioner of Patents and Trademarks*